Dec. 19, 1961 R. MAINZER 3,014,123
WARNING UNIT AND FLASHLIGHT FOR ENERGIZING SAME
Filed July 9, 1958 2 Sheets-Sheet 1

INVENTOR.
ROBERT MAINZER
BY
*James and Franklin*
ATTORNEYS

Dec. 19, 1961  R. MAINZER  3,014,123
WARNING UNIT AND FLASHLIGHT FOR ENERGIZING SAME
Filed July 9, 1958  2 Sheets-Sheet 2
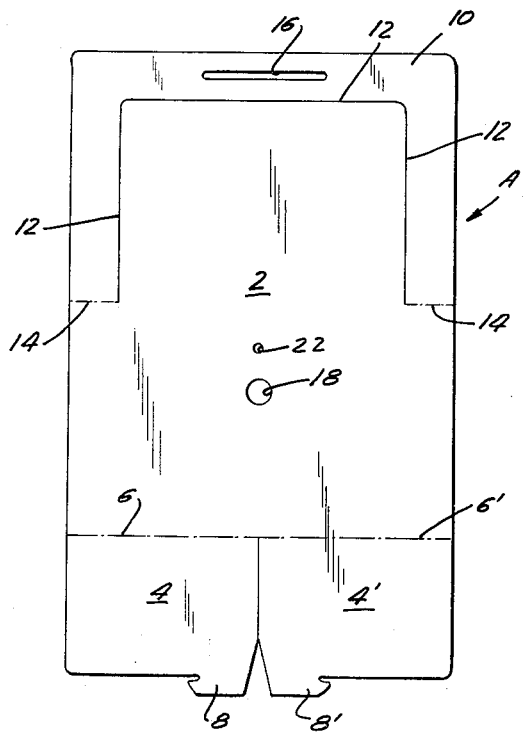
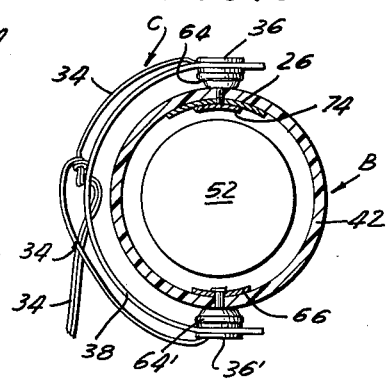
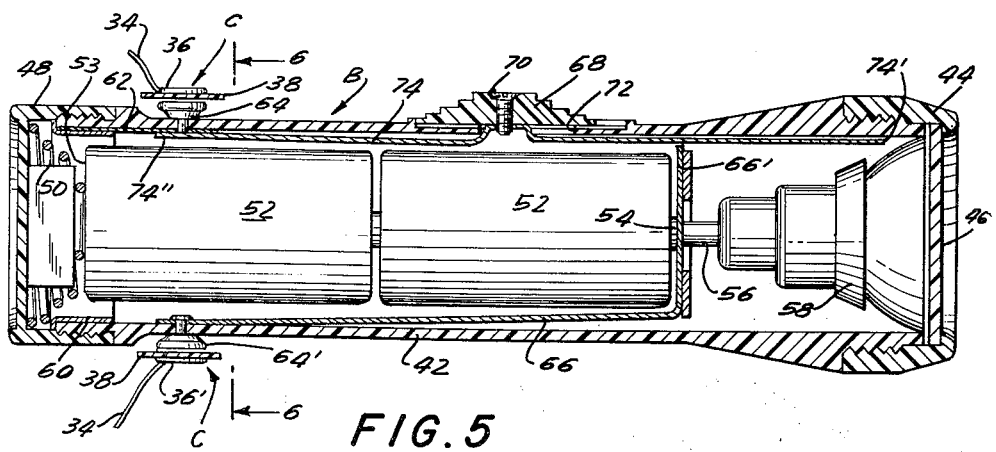
INVENTOR.
ROBERT MAINZER
BY
James and Franklin
ATTORNEYS

United States Patent Office 3,014,123
Patented Dec. 19, 1961

3,014,123
WARNING UNIT AND FLASHLIGHT FOR ENERGIZING SAME
Robert Mainzer, Emerson, N.J., assignor to Bright Star Industries, Clifton, N.J., a corporation of New Jersey
Filed July 9, 1958, Ser. No. 747,468
5 Claims. (Cl. 240—6.4)

The present invention relates to a warning unit such as may be employed by motorists whose cars are disabled in order to give warning to other cars that there is an obstruction on the road ahead, to such a warning device which is energized from a flashlight without materially impairing the ability of the flashlight to be used in conventional manner, and to a flashlight adapted to serve as a source of energy for an external device.

Getting a flat tire on a well traveled highway is a serious matter, not because of anything which happens immediately to the car in question but because the person who is fixing the flat tire is all too frequently struck by a passing car. It therefore is quite important from a safety point of view that when a car is disabled and cannot be driven off the road some means must be provided for warning approaching cars that the highway is obstructed, and such warning must be given a considerable distance in advance of the obstruction if the approaching car is to have an opportunity to take appropriate action. Devices of this general type are available and are used by construction crews or the like. They are quite costly and therefore unlikely to be purchased by the casual motorist who may in a lifetime of driving never have occasion to use it. These available devices are, moreover, fairly heavy and bulky, and consequently not susceptible of being carried in a passenger automobile along with luggage and other impedimentia.

In accordance with the present invention, however, a highly effective warning device is provided which is light and inexpensive and takes up little or no room. It is, moreover, adapted to be energized from a flashlight, an accessory which every thoughtful motorist will carry in any event, and which may be stored in the glove compartment of his car. The present invention involves the use of a flashlight which can be manipulated in conventional manner to provide illumination where that illumination is required, and which is modified so as to be capable of serving as a source of electric power for the warning device when the latter is positioned an appreciable distance up the road, and without detracting from the use of the flashlight for illumination purposes if desired.

The warning device per se comprises a folded blank structure which can be stored in substantially flat condition and which can be erected to a self-supporting condition in which it is adapted to rest upon the roadway with a panel thereof supported so as to be readily seen by the drivers of approaching cars. That panel carries a bulb, which may be designed to flash so as to attract attention, to which bulb is electrically connected a pair of wire leads of appreciable length. In stand-by condition these leads are wound on a bracket carried by the device, but when the device is placed on the road they may be unwound so as to extend from the device to the vehicle in trouble. The ends of the leads are provided with terminal elements which are adapted to be secured to corresponding terminal elements mounted on the exterior of a specially constructed flashlight, these external flashlight terminals being electrically connected to the opposite ends of the batteries in the flashlight. As a result the flashlight batteries themselves can power or energize the bulb in the display device whether the flashlight is turned on or off, and because of the flexibility of the wire leads the flashlight can be used to provide illumination while at the same time energizing the bulb in the display device. The flashlight can, of course, be used without having the external leads connected thereto, in conventional manner.

Thus the casual motorist, in order to provide for his safety in time of emergency, need merely carry in his car a flashlight of the type here disclosed (and he would ordinarily have a flashlight with him in any event), and the inexpensive, light and compact collapsible display device of the type set forth hereinafter. No separate power supply for the display device is required other than the flashlight which is useable as such.

To the accomplishment of the above, and to such other objects as may hereinafter appear, the present invention relates to the combination of a display device and a flashlight for energizing the same, and to the construction of the display device and the flashlight per se, all as defined in the appended claims and as described in this specification, taken together with the accompanying drawings, in which:

FIG. 4 is a top plan view of the blank of which the display device is formed;

FIG. 5 is a cross sectional view of the flashlight which is used in conjunction with the display device; and FIG. 6 is a cross sectional view taken along the line 6—6 of FIG. 5.

The combination of the present invention comprises a display device generally designated A and a flashlight generally designated B adapted to be used as a power source for the display device A and also capable of being used as a conventional flashlight. Connection means generally designated C are provided for detachably electrically connecting the display device A to the flashlight B for energization of the former by the latter.

Figure 1:
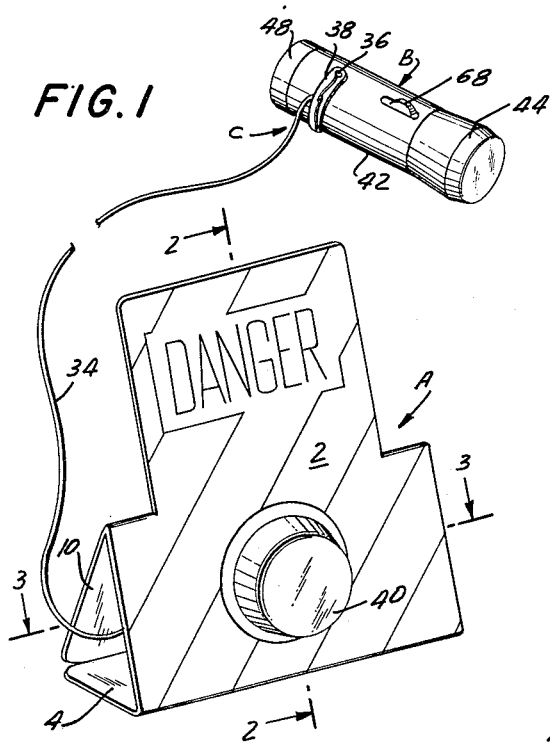
FIG. 1 is a three-quarter perspective view of the display device in erected condition and connected to a flashlight for energization.
Figure 2:
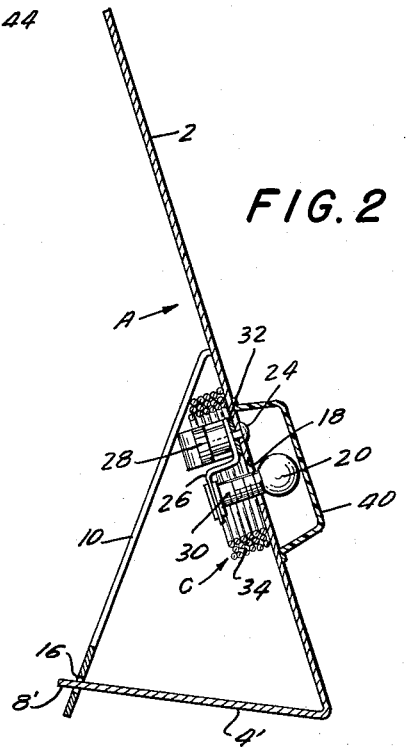
FIG. 2 is a cross sectional view of the display device taken along the line 2—2 of FIG. 1.
Figure 3:
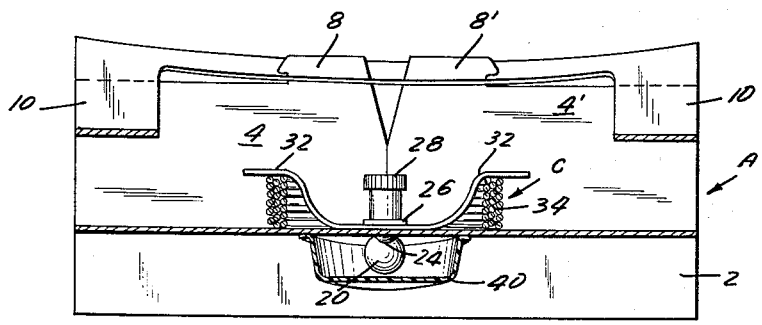
FIG. 3 is a cross sectional view of the display device taken along the line 3—3 of FIG. 1.

The display device A comprises a stand preferably formed from a single sheet of appropriate structural material such as heavy cardboard or corrugated paperboard. The flat blank from which the display device A may be erected is shown in FIG. 4. The device comprises a display panel 2 with a two-part base panel 4, 4' connected to the bottom thereof by foldlines 6 and 6'. The ends of the base panels 4 and 4' are provided with hooked tabs 8 and 8' at their free ends. A U-shaped connecting panel 10 is separated from the upper portion of the display panel 2 by cuts 12 and is connected to the display panel 2 by foldlines 14 located above the foldlines 6, 6'. It is provided on the portion which defines the base of the U with a slot 16 into which the tabs 8 and 8' of the base panels 4 and 4' are adapted to extend and with which the hooked portions thereof are adapted to engage. The display device A is shown in erected condition in FIGS. 1-3 with the tabs 8 and 8' engaged with the slot 16, the various panels then defining an easel-like structure with the display panel 2 retained in a readily visible substantially upright condition. The exposed surface of the display panel 2 may carry suitable warning language, colors and/or designs.

The base panel 2 is provided with an aperture 18 through which a bulb 20 is adapted to extend. A second and smaller aperture 22 is provided in the display panel 2 above the aperture 18 through which a screw 24 is adapted to extend, a bracket 26 being mounted on the screw 24 and held in place by nut 28, the bracket 26 in turn supporting a socket 30 for the bulb 20. Also mounted on the screw 24 is a second bracket part having a pair of laterally extending wings 32 on which an appreciable length of wire 34 may be wound. Two wire leads are provided, each having one end electrically connected to an appropriate terminal on the bulb socket 30, the other ends of the wires being provided with terminal elements 36 and 36' adapted to be connected to a source of electrical power. As here specifically disclosed the terminal elements 36 and 36' are carried at opposite ends of a flexible insulating strip 38, and the terminal elements 36 and 36' themselves are in the form of male snap fastener elements. A reflector lens 40 of suitable transparent or translucent material is secured to the outer surface of the display panel 2 by any appropriate means, such as adhesive, so as to cover the bulb 20.

The flashlight B which is specially adapted to serve as the source of power for the display device A comprises, as is conventional, a casing 42 having a removable front cap 44 carrying a lens 46 and also having a removable rear cap 48 which contains a battery-engaging spring 50. A pair of flashlight battery cells 52 are adapted to be received inside the casing 42. When the flashlight is assembled the spring 50 engages the base terminal 53 of the rearmost battery 52 and urges the batteries forwardly so that the tip terminal 54 of the foremost battery 52 operatively engages the tip terminal 56 of a combined socket and reflector 58 in which a flashlight bulb (not shown) may be mounted in conventional manner. The spring 50 is conductive and engages a conductive ring 60 on the inside of the rear end of the casing 42, making electrical connection therewith. A conductive strip 62 is in contact with the ring 60 and extends forwardly therefrom along one side of the casing 42, a contact terminal 64 located on the exterior of the casing 42 penetrating the casing 42 so as to engage and make electrical connection with the strip 62. The terminal 64 is shown in the form of a snap fastener element to which one of the male snap fastener elements 36 and 36' is adapted to be detachably connected.

An elongated L-shaped conductive strip 66 extends along the inside of the casing 42 at a point spaced from, and preferably substantially diametrically opposed to, the strip 62, the rear end of the strip 66 being engaged by and making electrical connection with a second terminal element 64' mounted on the exterior of and penetrating the casing 42. It, like the terminal element 64, is in the form of a female snap fastener element to which the other of the male snap fastener elements 36, 36' may be detachably connected. The forward end 66' of the strip 66 engages and makes electrical connection with the tip terminal 54 of the foremost battery 52, preferably by being interposed between that tip terminal 54 and the tip terminal 56 of the flashlight bulb socket 58.

A sliding switch-actuating member 68 is mounted on the exterior of the casing 42 and is connected, by means of screw 70 passing through slot 72 in the casing 42, with a conductive strip 74 inside the casing 42, the strip 74 being slidable between the rearward position shown in FIG. 5, in which its forward tip 74' is spaced from the side of the socket 58, and a forward position in which the tip 74' engages and makes electrical connection with the outer surface of the socket 58, that outer surface being electrically connected to one of the terminals of the flashlight bulb, the other terminal of that bulb being connected to the tip terminal 56 of the socket 58. The rear end 74" of the strip 74 slides over and makes electrical connection with the strip 62 in all of the operative positions of the strip 74.

The flashlight B may be used in conventional manner. When the switch-actuating member 68 is pushed forwardly a circuit is completed through the flashlight bulb from the tip terminal 54 of the foremost battery 52 through the tip terminal 56 of the socket 58, through the bulb, and then from the other terminal of the bulb through the external surface of the socket 58, the strip 74, the strip 62, the ring 60, and the spring 50 to the base terminal 53 of the rearmost battery 52. The flashlight bulb will then be illuminated. When the switch actuating member 68 is moved to its rearward position as shown in FIG. 5 the circuit is opened, since the tip 74' of the strip 74 is withdrawn from the outer surface of the socket 58, and the flashlight bulb will not light.

The display device A is normally stored in flattened condition, with its blank as shown in FIG. 4 but with the various appertenances attached thereto. The lens 40, which may be formed from a sturdy plastic material, will protect the bulb from injury. When the device is to be used the connecting panel 10 is swung downwardly and rearwardly, the base panels 4 and 4' are swung rearwardly, the tabs 8 and 8' are passed through and engaged with the slots 16 in the connecting panel 10, and the device is thus made self-supporting. It is placed upon the roadway a sufficient distance behind the obstruction or disabled vehicle, and it will rest on the roadway with the display panel 2 prominently in view. If desired a weight may be placed upon the base panels 4 and 4' in order to prevent a wind from blowing the device over. The wires 34 are then unwound from the wings 32, sufficient length of wire being provided so that the terminal elements 36, 36' and the flexible strip 38 on which they are mounted can be carried back to the obstruction or disabled vehicle. The terminal elements 36 and 36' are then snapped into the external terminal elements 64 and 64' on the flashlight B. The length of the strip 38 is substantially the same as the circumferential distance between the external flashlight terminals 64 and 64', thus facilitating this operation and ensuring that both of the display device terminals 36 and 36' are readily available. The bulb 20 in the display device A will then light, a circuit therefor being traceable from the tip terminal 54 of the foremost battery 52 through the strip 66, the flashlight terminal 64', the display device 36' and one of the wires 34 to an appropriate terminal on the socket 30, through the bulb 20, and from the other terminal on the socket 30 through the other wire 34 to the display device terminal 36, the external flashlight terminal 64, the strip 62, the ring 60, and the spring 50 to the base terminal 53 of the rearmost battery 52. Thus it will be seen that the display device bulb 20 will light independently of the position of the switch actuating member 68 on the flashlight 42. It is preferred, in order to minimize the current drain from the flashlight batteries 52, and also in order to more surely draw the attention of oncoming motorists to the display device A, that the bulb 20 flash on and off. A separate flashing control may be interposed in the circuit to the display device bulb 20, or a bulb 20 may be used into which a flashing control is built, all as is conventional.

If one wishes to use the flashlight 42 for illumination purposes while the display device A is illuminated, one can do so. The flexible nature of the wires 34, and the fact that an appropriate length of such wires is provided, permits manipulation of the flashlight without affecting the operation of the display device A, and the flashlight bulb can be turned on and off at will through manipulation of the switch actuating member 68 in conventional fashion without affecting the energization of the display device A.

When the emergency is over the display device terminals 36, 36' are snapped out of the external flashlight terminals 64, 64', the wires 34 are rewound upon the wings 32, the display device stand is collapsed to its flat condition, and the display device is then stored in any appropriate place in the car, where it takes up a truly minimal amount of space. The flashlight B is stored wherever a flashlight would ordinarily be stored. The bulb 20 of the display device A is replaced by removing the bracket 26, and with it the socket 30 and the bulb 20, replacing the bulb 20, and then resecuring the bracket 20 to the display panel 2.

From the above it will be seen that the combination here disclosed provides the motorist with a simple, inexpensive and readily stored emergency warning signal which may be positioned on the roadway at an appreciable distance from his car and for which no special power source of its own need be provided, the flashlight constructed in accordance with the present invention serving as that power source and also serving as a conventional flashlight whether it is being used to energize the display device or not.

While but a single embodiment of the present invention has been here disclosed, it will be apparent that many variations may be made therein, all within the scope of the instant invention as defined in the following claims.

I claim:

1. In combination with a flashlight comprising a casing in which is contained a bulb, a battery, and circuitry for controllably illuminating said bulb from said battery, terminals on the exterior of said casing, and electrical connections between said terminals and opposite electrical ends of said battery, whereby said flashlight can be used as a source of power for an external device adapted to be electrically energized; a stand comprising a display panel, a base panel, and connecting panels between said panel and elevated points on said display panel, a bulb carried by said display panel, and a pair of elongated leads electrically connected to said bulb and carrying at their respective ends terminal elements secured to said terminals on the exterior of said flashlight casing, said display panel having a part about which said leads are coiled when not in use.

2. In combination with a flashlight comprising a casing in which is contained a bulb, a battery, and circuitry for controllably illuminating said bulb from said battery, terminals on the exterior of said casing, and electrical connections between said terminals and opposite electrical ends of said battery, whereby said flashlight can be used as a source of power for an external device adapted to be electrically energized; a stand comprising a display panel, a base panel, and connecting panels between said base panel and elevated points on said display panel, a bracket secured to said display panel, a bulb carried by said bracket, and a pair of elongated leads electrically connected to said bulb and carrying at their respective ends terminal elements comprising snap fastener elements mounted on a strip, said terminals on the exterior of said flashlight casing comprising complementary snap fastener elements connected to the strip-mounted snap fastener elements, said leads when not in use being coiled around said bracket.

3. In combination with a flashlight comprising a casing in which is contained a bulb, a battery, and circuitry for controllably illuminating said bulb from said battery, terminals on the exterior of said casing, and electrical connections between said terminals and opposite electrical ends of said battery, whereby said flashlight can be used as a source of power for an external device adapted to be electrically energized; a stand formed from a single sheet of material and comprising a display panel, a base panel, and connecting panels between said base panel and elevated points on said display panel, a bracket secured to the rear surface of said display panel, a bulb carried by said bracket, said display panel having an aperture with which said bulb registers, and a pair of elongated leads electrically connected to said bulb and carrying at their respective ends terminal elements secured to said terminals on the exterior of said flashlight casing, said leads when not in use being coiled around said bracket.

4. In combination with a flashlight comprising a casing in which is contained a bulb, a battery, and circuitry for controllably illuminating said bulb from said battery, terminals on the exterior of said casing, and electrical connections between said terminals and opposite electrical ends of said battery, whereby said flashlight can be used as a source of power for an external device adapted to be electrically energized; a stand formed from a single sheet of material and comprising a display panel, a base panel, and connecting panels between said base panel and elevated points on said display panel, a bracket secured to the rear surface of said display panel, a bulb carried by said bracket, said display panel having an aperture with which said bulb registers, and a pair of elongated leads electrically connected to said bulb and carrying at their respective ends terminal elements comprising snap fastener elements mounted on a strip, said terminals on the exterior of said flashlight casing comprising complementary snap fastener elements connected to the strip-mounted snap fastener elements, said leads when not in use being wound around said bracket.

5. In combination with a flashlight comprising a casing in which is contained a bulb, a battery and circuitry for controllably illuminating said bulb from said battery, terminals on the exterior of said casing, and electrical connections between said terminals and opposite electrical ends of said battery, whereby said flashlight can be used as a source of power for an external device adapted to be electrically energized; a stand comprising a display panel, means operatively connected to said display panel for supporting it in a substantially upright position, a bracket secured to said display panel, a bulb carried by said bracket, and a pair of elongated leads electrically connected to said bulb and carrying at their respective ends terminal elements comprising snap fastener elements, said terminals on the exterior of said flashlight casing comprising complementary snap fastener elements, said snap fastener elements of the elongated leads being connected to the complementary snap fastener elements of said terminals said leads when not in use being coiled around said bracket.

References Cited in the file of this patent

UNITED STATES PATENTS

| | | |
|---|---|---|
| 1,149,933 | Martzolf | Aug. 10, 1915 |
| 1,691,472 | Graham et al. | Nov. 13, 1928 |
| 1,900,906 | Brown | Mar. 14, 1933 |
| 1,951,431 | Meehan | Mar. 20, 1934 |
| 2,201,653 | McCreary | May 21, 1940 |
| 2,550,234 | Duncan | Apr. 24, 1951 |
| 2,719,506 | Seqneria | Oct. 4, 1955 |
| 2,727,981 | Carpenter | Dec. 20, 1955 |
| 2,855,499 | Lewis | Oct. 7, 1958 |